United States Patent
Thoria et al.

(10) Patent No.: US 12,199,868 B2
(45) Date of Patent: Jan. 14, 2025

(54) OPTIMIZING IPSec FOR HIERARCHICAL SD-WAN

(71) Applicant: Cisco Technology, Inc., San Jose, CA (US)

(72) Inventors: Samir Thoria, Saratoga, CA (US); Ram Dular Singh, Cupertino, CA (US); Laxmikantha Reddy Ponnuru, San Ramon, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 56 days.

(21) Appl. No.: 17/804,333

(22) Filed: May 27, 2022

(65) Prior Publication Data
US 2023/0388233 A1    Nov. 30, 2023

(51) Int. Cl.
*H04L 45/76* (2022.01)
*H04L 9/40* (2022.01)
*H04L 45/50* (2022.01)
*H04L 45/64* (2022.01)

(52) U.S. Cl.
CPC .............. *H04L 45/76* (2022.05); *H04L 45/50* (2013.01); *H04L 45/64* (2013.01); *H04L 63/0485* (2013.01)

(58) Field of Classification Search
None
See application file for complete search history.

(56) References Cited

U.S. PATENT DOCUMENTS

| | | | | |
|---|---|---|---|---|
| 11,863,443 | B2* | 1/2024 | Kulkarni | H04L 41/0895 |
| 2004/0093521 | A1* | 5/2004 | Hamadeh | H04L 69/161 |
| | | | | 726/22 |
| 2015/0023357 | A1* | 1/2015 | Imai | H04L 63/0428 |
| | | | | 370/395.53 |
| 2016/0218917 | A1* | 7/2016 | Zhang | H04L 45/42 |
| 2017/0279710 | A1* | 9/2017 | Khan | H04L 45/748 |
| 2018/0109493 | A1* | 4/2018 | Khan | H04L 63/0209 |
| 2019/0058657 | A1* | 2/2019 | Chunduri | H04L 45/50 |
| 2019/0372891 | A1* | 12/2019 | Smith | H04L 1/008 |
| 2020/0250009 | A1* | 8/2020 | Jaeger | H04L 63/20 |
| 2020/0274794 | A1* | 8/2020 | Zhang | H04L 41/5006 |
| 2021/0092050 | A1* | 3/2021 | Williams | H04L 63/18 |

(Continued)

OTHER PUBLICATIONS

IPsec Configuration Guide, Cisco IOS XE 16 (Cisco ASR 920 Series), Cisco Systems, Inc., Jul. 31, 2019.

(Continued)

*Primary Examiner* — Phirin Sam
(74) *Attorney, Agent, or Firm* — Baker Botts L.L.P.

(57) ABSTRACT

According to some embodiments, a method is performed by a software defined wide area network (SD-WAN) edge router in a hierarchical SD-WAN network comprising a plurality of edge routers and a plurality of border routers. The method comprises: originating a SD-WAN system route for advertising reachability to the edge router, the system route comprising an encryption key associated with the edge router; and transmitting the system route to one or more SD-WAN border routers. The method may further comprise: receiving a packet destined for the edge router from one of the one or more SD-WAN border routers, wherein the packet is at least partially encrypted with the encryption key associated with the edge router; and decrypting the received packet.

19 Claims, 8 Drawing Sheets

(56) References Cited

U.S. PATENT DOCUMENTS

| | | | | |
|---|---|---|---|---|
| 2021/0160213 A1* | 5/2021 | Dees | .................... | H04L 67/125 |
| 2021/0243053 A1* | 8/2021 | Dunbar | ................ | H04L 69/326 |
| 2021/0314411 A1* | 10/2021 | Madden | ................ | H04L 69/28 |
| 2021/0377154 A1* | 12/2021 | Dutta | ..................... | H04L 45/16 |
| 2022/0070146 A1* | 3/2022 | Gerstel | .............. | H04L 12/2854 |
| 2022/0078103 A1* | 3/2022 | Prajapat | ............. | H04L 45/3065 |
| 2022/0103470 A1* | 3/2022 | Kulkarni | ............ | H04L 12/4633 |
| 2022/0382615 A1* | 12/2022 | Turk | ..................... | G06F 11/079 |
| 2023/0116163 A1* | 4/2023 | Scholz | ............... | H04L 61/2567 |
| | | | | 370/392 |
| 2023/0116881 A1* | 4/2023 | Mehta | .................. | H04L 43/065 |
| | | | | 709/238 |
| 2023/0246950 A1* | 8/2023 | Kaimal | ............... | H04L 63/062 |
| | | | | 709/223 |
| 2023/0246960 A1* | 8/2023 | Kaimal | .................. | H04L 45/12 |
| | | | | 370/389 |
| 2023/0261945 A1* | 8/2023 | Wang | ................ | H04L 41/5009 |
| | | | | 709/223 |

OTHER PUBLICATIONS

Cisco SD-WAN Security Configuration Guide, Cisco IOS XE Release 17.x, Cisco Systems, Inc., Nov. 22, 2019.

\* cited by examiner

OPTIMIZING IPSec FOR HIERARCHICAL SD-WAN

TECHNICAL FIELD

This disclosure generally relates to software defined networking in a wide area network (SD-WAN), and more specifically to optimizing Internet Protocol Security (IPSec) for hierarchical SD-WAN.

BACKGROUND

Traditional wide area network (WAN) architectures connect users at branch or campus locations to applications hosted on servers in a data center. Typically, dedicated Multiprotocol Label Switching (MPLS) circuits are used for security protection and reliable connectivity. However, businesses are becoming increasingly mobile, and business-critical applications are operating over the Internet across multiple clouds. Traditional WAN architectures may be limited in available bandwidth, security, and complexity management, which may hinder a business's productivity.

Software defined networking in a WAN (SD-WAN) simplifies the management and operation of a WAN by decoupling the networking hardware from its control mechanism. Advantages include reducing costs with transport independence across multiple technologies, improving business application performance and increasing agility, optimizing the user experience and efficiency for SaaS and public cloud applications, and simplifying operations with automation and cloud-based management.

BRIEF DESCRIPTION OF THE DRAWINGS

For a more complete understanding of the disclosed embodiments and their features and advantages, reference is now made to the following description, taken in conjunction with the accompanying drawings, in which.

DESCRIPTION OF EXAMPLE EMBODIMENTS

Overview

A software defined wide area network (SD-WAN) may include various overlay configurations. In one overlay model, overlay tunnels exist directly between SD-WAN edge routers. In another model, overlay tunnels exist hop by hop between SD-WAN edge and intermediate SD-WAN routers. The second overlay model may be referred to as hierarchical SD-WAN. Some examples of a hierarchical SD-WAN overly model include a hub and spoke topology or a multiple-region SD-WAN connected over a common middle mile/core.

SD-WAN implementations use Internet Protocol Security (IPSec) encryption when confidentiality of customer traffic is critical. IPSec encryption and decryption is compute intensive and often offloaded to hardware accelerators. In a hierarchical SD-WAN overlay model, the intermediate SD-WAN routers aggregate multiple tunnels from a number of edge routers and require higher IPSec throughput. These operation are significant because effective throughput is an important metric in competitive comparison of network providers.

Figure 1:
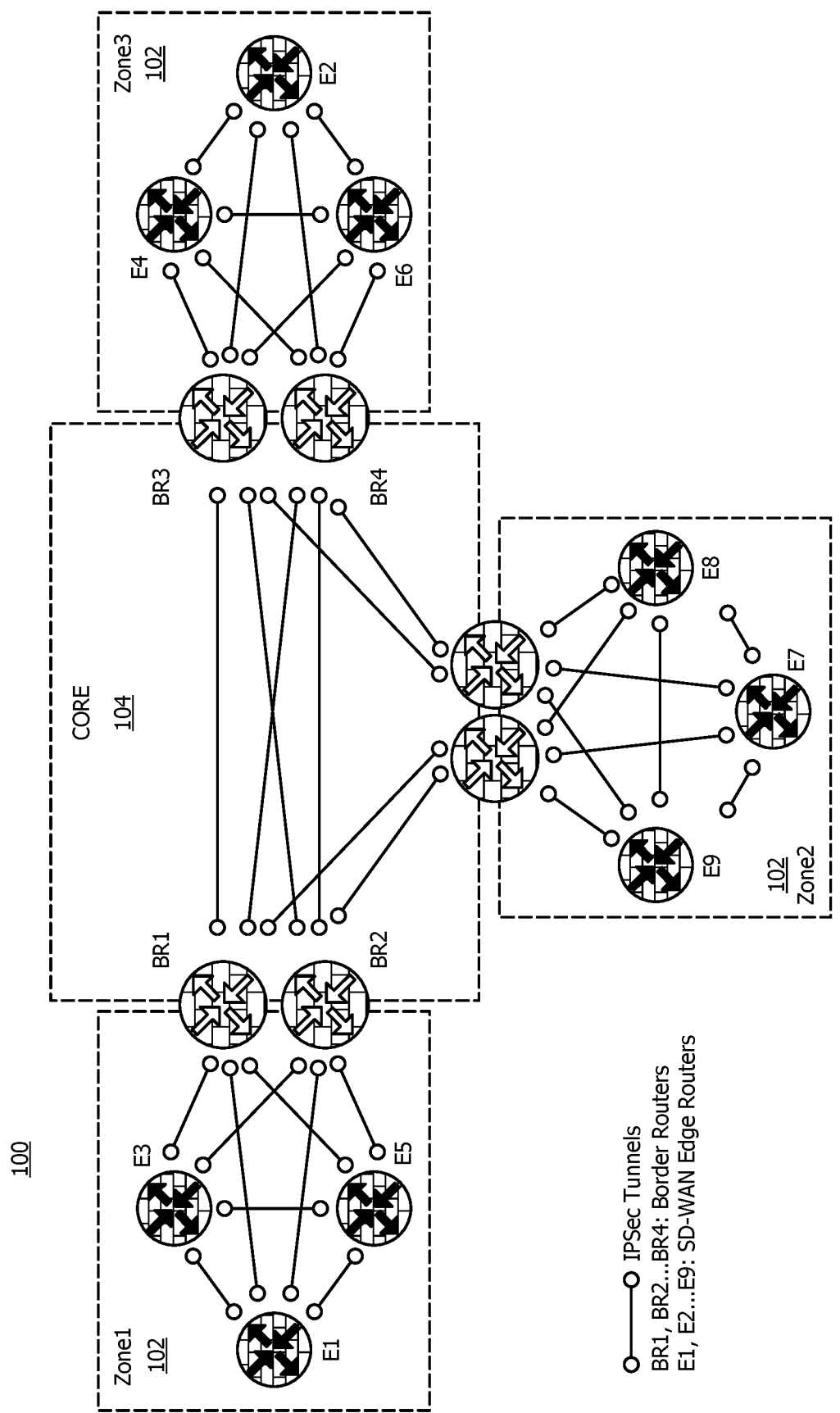
FIG. 1 is a network diagram illustrating an example hierarchical SD-WAN.

FIG. 1 is a network diagram illustrating an example hierarchical SD-WAN. As illustrated, SD-WAN network 100 is deployed via collection of regional networks 102 that are stitched to a common SD-WAN core network 104. SD-WAN edge routers (E1-E9) provide connectivity to customer networks. SD-WAN border routers (BR1-BR4) provide cross region connectivity to regional networks, thus forming a hierarchy of networks.

IPSec tunnels are deployed full mesh (may also be deployed hub and spoke) between edge routers in a given region and regional border router. Border routers themselves are fully meshed via IPSec tunnels in the core.

Inter-region traffic between an edge router in one zone to another follows a path with three tunnels. The three tunnels include a first tunnel from traffic ingress edge router to its zone local border router, a second tunnel from a border router in the ingress traffic zone to a border router in the egress traffic zone, and finally a third tunnel from a border router in the egress zone and an egress edge router.

Such an architecture is useful to optimize tunnel scale on edge routers and also to decouple regional networks from the core network. The core network may be built on top of a middle mile provider, and the regional network may be built on top of a local service provider. Overall, such an architecture is of interest to managed service providers.

One way to deploy IPSec in a SD-WAN overlay is as follows. Border routers (which provide intermediate tunnel hops for inter-region traffic) perform full IPSec encrypt/decrypt functionality for transit traffic. An example is illustrated in FIG. 2.

Figure 2:
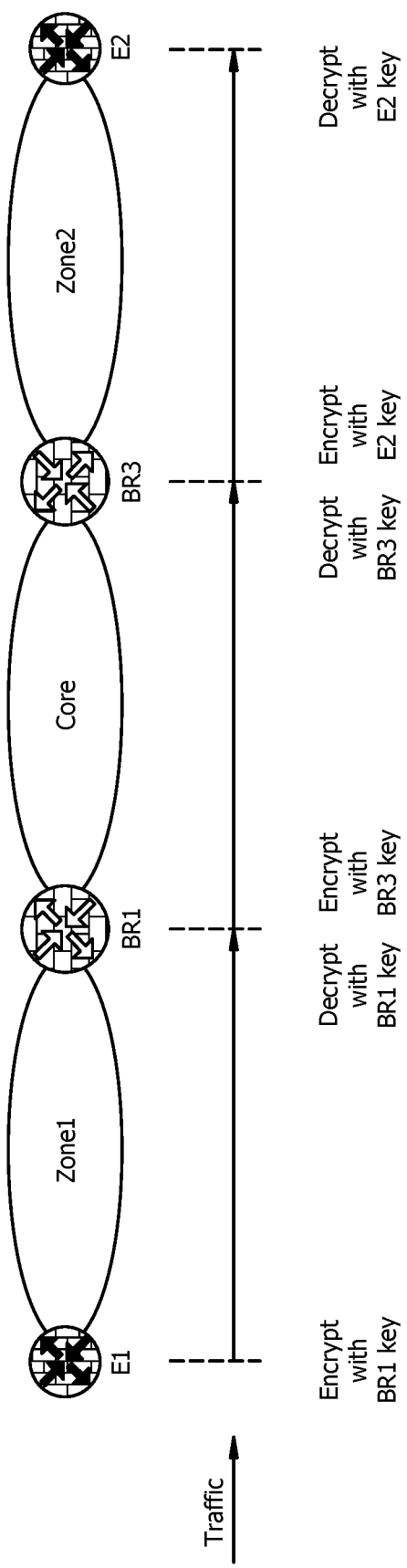
FIG. 2 is a network diagram illustrating hop by hop IPSec encryption and decryption.

FIG. 2 is a network diagram illustrating hop by hop IPSec encryption and decryption. In the illustrated example, a source in a customer network attached to edge router E1 in zone 1 sends traffic to a destination in a customer network attached to edge router E2 in zone 2. In this example, the traffic forwarding and IPsec encrypt/decrypt is performed as follows.

At ingress edge router E1, the traffic is encrypted with a key associated with border router BR1. At ingress border router BR1, the traffic is decrypted with the key associated with border router BR1 and then encrypted with a key associated with border router BR3. At egress border router BR3, the traffic is decrypted with the key associated with border router BR3 and encrypted with a key associated with edge router E2. At egress edge router E2, the traffic is decrypted with the key associated with edge router E2.

While the hop by hop IPSec encryption and decryption design works, it puts a burden on the border routers to provide a high throughput of IPSec encryption and decryption. Because the border routers aggregate regional traffic, their IPSec throughput requirements are significantly higher compared with that required on edge routers. While meeting the higher throughput requirements via scale up hardware accelerated border routers may be possible, this drives up the cost.

One non-scalable solution is to avoid tunnel termination on border routers altogether. This, however, only moves the burden of supporting high tunnel scale to edge routers because then the edge routers need to provide the edge to any edge connectivity. In addition, in some scenarios edge routers in one region may not have direct routing reachability from one region to another, which prevents an end to end tunnel from one region to another. The lack of routing reachability may occur, for example, when the two regions use private multiple protocol label switching (MPLS) networks from different regional service providers.

Particular embodiments described herein eliminate the encrypt/decrypt overhead while not compromising end to end security, all in a scalable fashion. Particular embodiments optimize IPSec operation on the intermediate SD-WAN routers in a hierarchical overlay model such that SD-WAN can provide end to end confidentiality of customer traffic without decrypting/re-encrypting at intermediate nodes. The optimization still enforces hop by hop integrity checks for the customer payload, ensuring that the traffic is not tampered with in transit.

According to some embodiments, a SD-WAN system comprises a first edge router communicably coupled to a first border router. The first edge router is configured to originate a SD-WAN system route for advertising reachability to the first edge router. The system route comprises an encryption key associated with the first edge router. The first edge router is further configured to transmit the system route to the first border router.

The first border router is configured to receive the SD-WAN system route for advertising reachability to the first edge router, allocate a local label for the first edge router, and originate a SD-WAN system route for advertising reachability to the first edge router. The system route comprises the local label for the first edge router, the encryption key associated with the first edge router, and an authentication key associated with the first border router. The first border router is further configured to transmit the originated system route to one or more SD-WAN border routers or edge routers.

In particular embodiments, the first edge router is further configured to receive a packet destined for the first edge router from the first border router. The packet is at least partially encrypted with the encryption key associated with the first edge router. The first edge router is further configured to decrypt the received packet.

In particular embodiments, the first border router is further configured to receive a packet destined for the first edge router from one of one or more SD-WAN border routers or edge routers. The packet is at least partially encrypted with the encryption key associated with the first edge router and the packet comprises a local transport label. The first border router is further configured to authenticate the packet using the authentication key associated with the first border router, update one or more of a local transport label, source address, and destination address associated with the received packet, and forward the packet to one of the one or more SD-WAN border routers or edge routers based on the local transport label without decrypting the at least partially encrypted packet.

In particular embodiments, the system route comprises a SD-WAN Overlay Management Protocol (OMP) route. The encryption key associated with the first edge router may comprise an IPSec Encapsulating Security Payload (ESP) protocol encryption key. The authentication key associated with the first border router comprises an IPSec Security Authentication Header (AH) protocol authentication key.

In particular embodiments, the first edge router is communicably coupled to the first border router via an IPSec tunnel.

In particular embodiments, the first edge router is further configured to encrypt a packet for transmission to a second edge router. The packet is encrypted with an encryption key associated with the second edge router received via a system route originated from the second edge router. The first edge router is further configured to transmit the packet to the first border router.

According to some embodiments, a method is performed by a SD-WAN edge router in a hierarchical SD-WAN network comprising a plurality of edge routers and a plurality of border routers. The method comprises originating a SD-WAN system route for advertising reachability to the edge router. The system route comprises an encryption key associated with the edge router. The method further comprises transmitting the system route to one or more SD-WAN border routers.

According to some embodiments, a method is performed by a SD-WAN border router in a hierarchical SD-WAN network comprising a plurality of edge routers and a plurality of border routers. The method comprises receiving a SD-WAN system route for advertising reachability to an edge router. The system route comprises an encryption key associated with the edge router. The method further comprises allocating a local label for the edge router and originating a SD-WAN system route for advertising reachability to the edge router. The system route comprises the local label for the edge router, the encryption key associated with the edge router, and an authentication key associated with the border router. The method further comprises transmitting the originated system route to one or more SD-WAN border routers or edge routers.

EXAMPLE EMBODIMENTS

Particular embodiments obviate one or more of the problems described above and include optimizing IPSec encryption/decryption in a hierarchical SD-WAN without compromising the confidentiality and integrity of the customer traffic. Particular embodiments eliminate the need to perform IPSec encryption/decryption on intermediate border routers and continue to provide integrity/data source validation on the border router for protection. In particular embodiments, intermediate border routers provide integrity check and bypass decryption/encryption cycles. On the SD-WAN overlay the customer traffic is only encrypted once at the source edge router and decrypted at the destination edge router.

An advantage of particular embodiments is enhanced performance of border routers and cost reduction compared with the IPsec decrypt/re-encrypt at every hop of SDWAN overlay solution. In particular embodiments, border routers do not have IPsec encrypt/decrypt keys. This addresses requirements from some customers (e.g., financial institutions) where traffic should not be decrypted in transit.

The same behavior cannot be accomplished via service side IPSec, because the SD-WAN overlay is expected to provide confidentiality and integrity of customer traffic independent of whether the customer payload is encrypted at the source from the application itself. In hierarchical SD-WAN, the IPSec tunnels are multi-hop (i.e., terminated and re-originated on border routers). There is no single end to end tunnel that is built with service side routing.

Embodiments of the present disclosure and their advantages are best understood by referring to FIGS. 3 through 9 of the drawings, like numerals being used for corresponding parts of the various drawings. Although certain embodiments may be described in reference to particular illustrated examples, the disclosure herein is not limited to the particular illustrated embodiments and/or configurations and includes any and all variants of the illustrated embodiments and any and all systems, methods, or apparatuses consistent with the teachings of this disclosure, as understood by a person having ordinary skill in the art.

In particular embodiments, end to end security is provided by the following constructs. Encryption/decryption is via the IPSec Encapsulating Security Payload (ESP) protocol at edge routers. This ensures confidentiality of customer traffic in the network. Authentication and integrity checking is via the IPSec Security Authentication Header (AH) protocol at border routers. This ensures integrity of customer traffic and data source validation as the traffic flows across the regional and core networks.

IPSec encryption and decryption on the border routers is required primarily to access the customer IP address for routing. Particular embodiments remove the need for access to the inner IP address by providing MPLS label based forwarding on the border routers. A MPLS label is allocated for the destination edge router and is carried in part of the header that is not encrypted via ESP. The label is protected against a man in the middle attack via IPsec integrity check. Exposing the label (per edge router) in clear text does not introduce any additional information than what the outer tunnel destination IP address does in a traditional implementation with flat overlay model. Thus, no additional security exposure is introduced by the embodiments described herein. The customer payload and the virtual private network (VPN) label is encrypted via the destination edge router's encryption key (as currently done in the traditional flat overlay model). The intermediate border routers do not decrypt/encrypt the payload and do not have the corresponding IPsec keys stored/available to do so. The resulting IPsec operation is summarized in FIG. 3.

Figure 3:
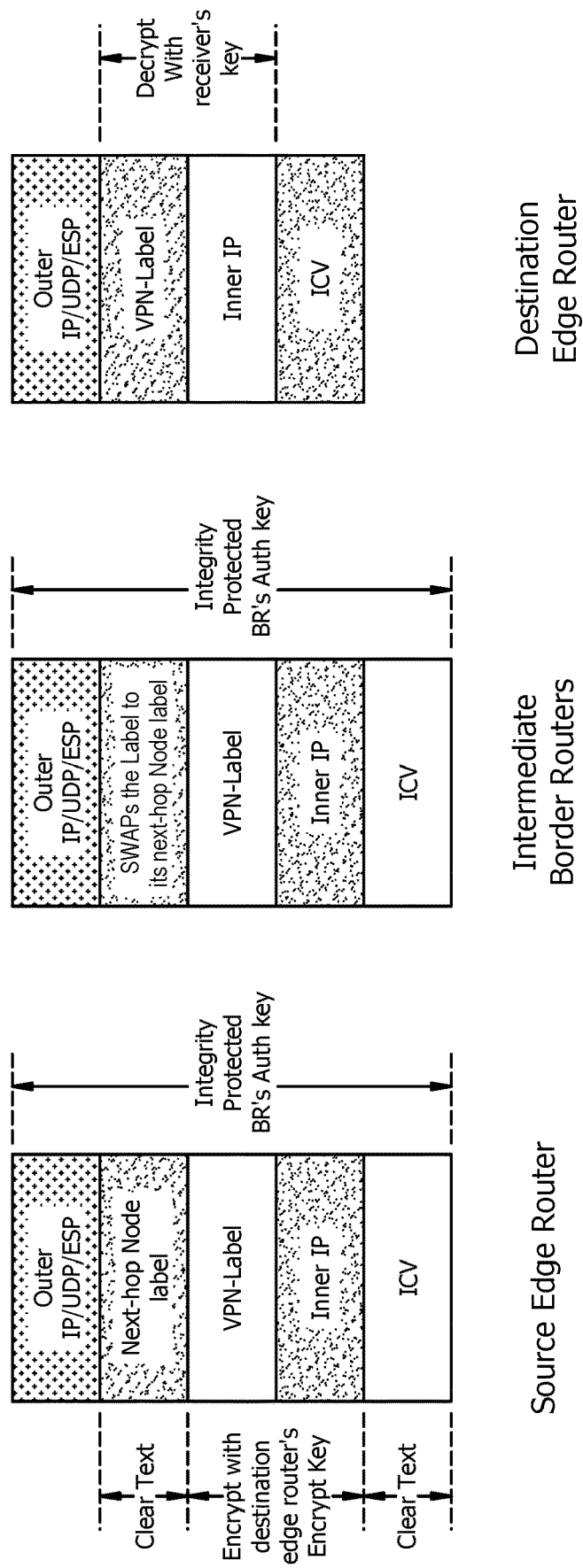
FIG. 3 illustrates IPSec operation at source edge router, intermediate border routers, and destination edge router, according to particular embodiments.

FIG. 3 illustrates IPSec operation at source edge router, intermediate border routers, and destination edge router, according to particular embodiments. At the source edge router, the VPN label and the inner IP are encrypted with the destination edge router's encryption key. The entire packet is integrity protected with the border router's authentication key. The intermediate border routers swap labels to the next hop node label. The packet remains integrity protected by the border router's authentication key. At the destination edge router, the VPN label and the inner IP are decrypted.

Particular embodiments include a new route in the Overlay Management Protocol (OMP), for example, that may be referred to herein as a SYSTEM route. The SYSTEM route is advertised by edge and border routers. The purpose of the SYSTEM route is to advertise: (a) reachability to a given edge router; (b) a downstream assigned MPLS label for a given edge router; and (c) IPsec encryption and authentication keys.

Figure 4:
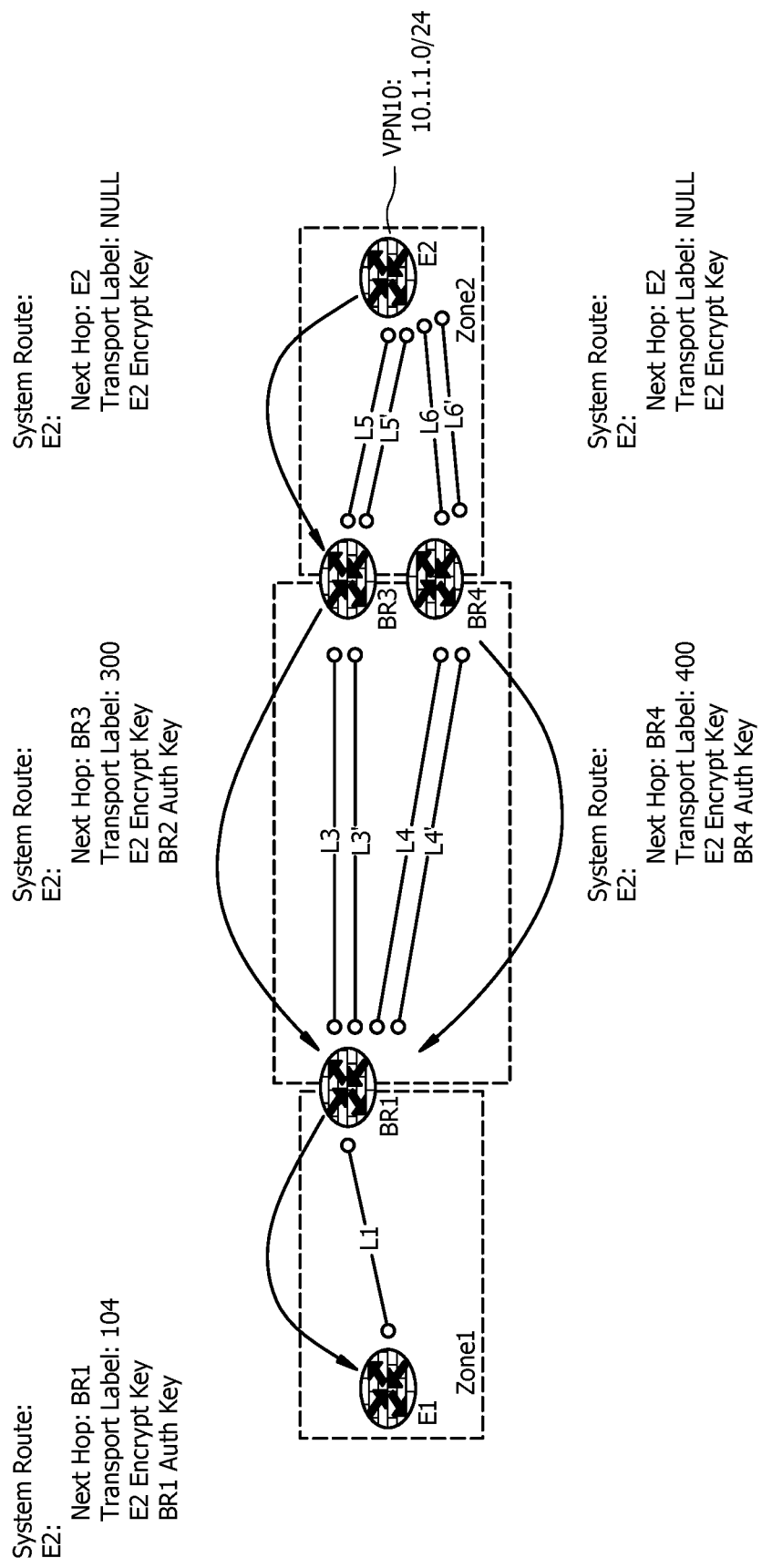
FIG. 4 is a network diagram illustrating an example of signaling IPSec keys.

FIG. 4 is a network diagram illustrating an example of signaling IPSec keys. The illustrated example captures an example advertisement that enables reachability for an edge router E2. VPN prefixes attached to E2 are advertised with E2 as the next hop via VROUTE (existing OMP route to advertise IP Prefix routes), and reachability to E2 itself is advertised via the SYSTEM route. Recursive route resolution of the VPN route over the SYSTEM route provides complete information to forward the traffic end to end. L1, L3, L4, L5 and L6 are IPSec tunnels between SD-WAN routers.

In FIG. 4, E2 originates a SYSTEM route to advertise reachability to itself and its own encryption keys. The SYSTEM route is received by border routers BR3 and BR4.

Border routers BR3 and BR4 program reachability to E2 via the direct tunnels (e.g., L5 and L6, respectively) to E2, allocate a local label for E2 (e.g., label 300 by BR3 and label 400 by BR4) and advertise a SYSTEM route with next hop as themselves. In this SYSTEM route, they also add their own IPsec authentication keys, and carry the unaltered E2 encryption key that they learned previously via the SYSTEM route originated from E2. The local label is programmed with label pop action and to forward on tunnels towards E2.

The SYSTEM routes advertised by BR3 and BR4 are received by BR1. BR1 learns it can reach E2 via BR3 and BR4. It allocates a local label (e.g., label 104) and sends a SYSTEM route towards E1 with itself as the next hop and its own IPSec authentication key, along with the unaltered E2 encryption key learned from the SYSTEM routes advertised by BR3/BR4. BR1 programs its local label, for example, to an equal-cost multipath (ECMP) path list with BR3 and BR4 as possible next hops. Along with the path list, the label 104 is programmed to swap with labels allocated by BR3 and BR4 respectively.

In all of the SYSTEM routes described above, the E2 encryption key is carried unaltered across border routers. Thus, at the end of the route exchange, IPSec encryption and authentication keys are programmed in forwarding on each of the routers from E1 to E2 as illustrated in FIG. 5.

Figure 5:
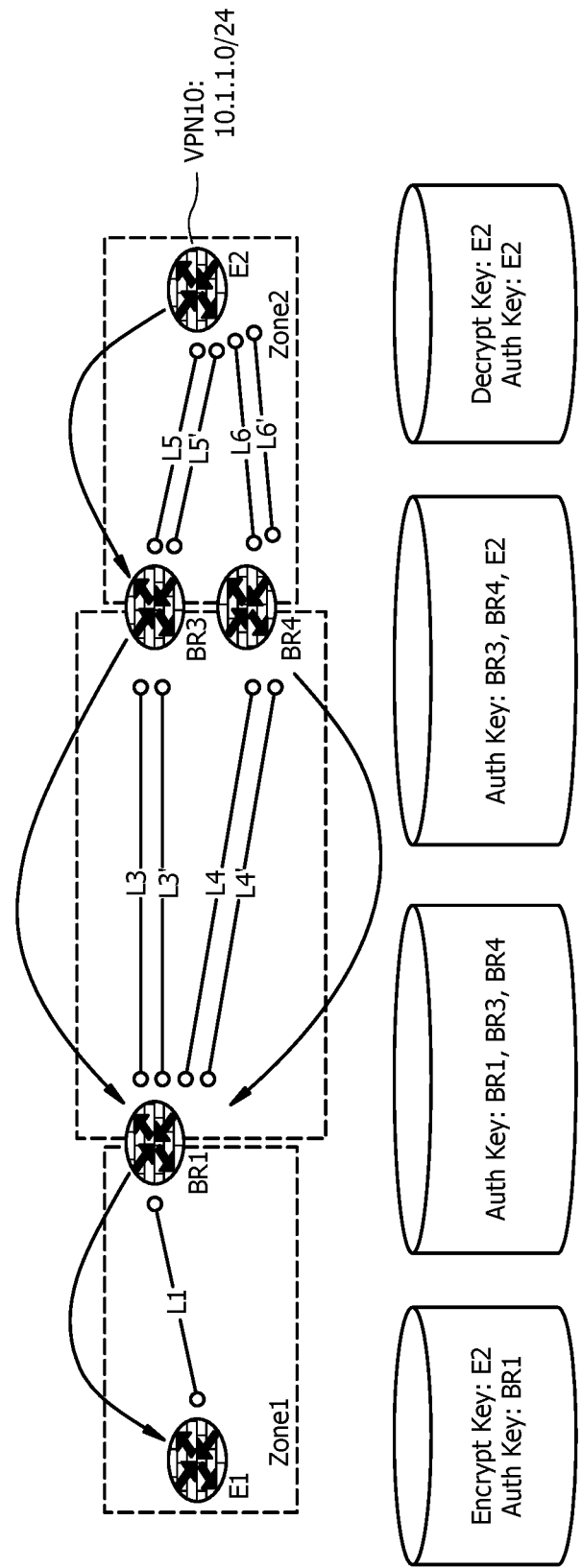
FIG. 5 is a network diagram illustrating IPSec key databases for the example described in FIG. 4.

FIG. 5 is a network diagram illustrating IPSec key databases for the example described in FIG. 4. As illustrated, edge router E2 stores the E2 decryption key and E2 authentication key. Border routers BR3 and BR4 each store the BR3 authentication key, BR4 authentication key, and E2 authentication key. Border router BR1 stores the BR1 authentication key, BR3 authentication key and BR4 authentication key. Edge router E1 stores the E2 encryption key and BR1 authentication key.

Figure 6:
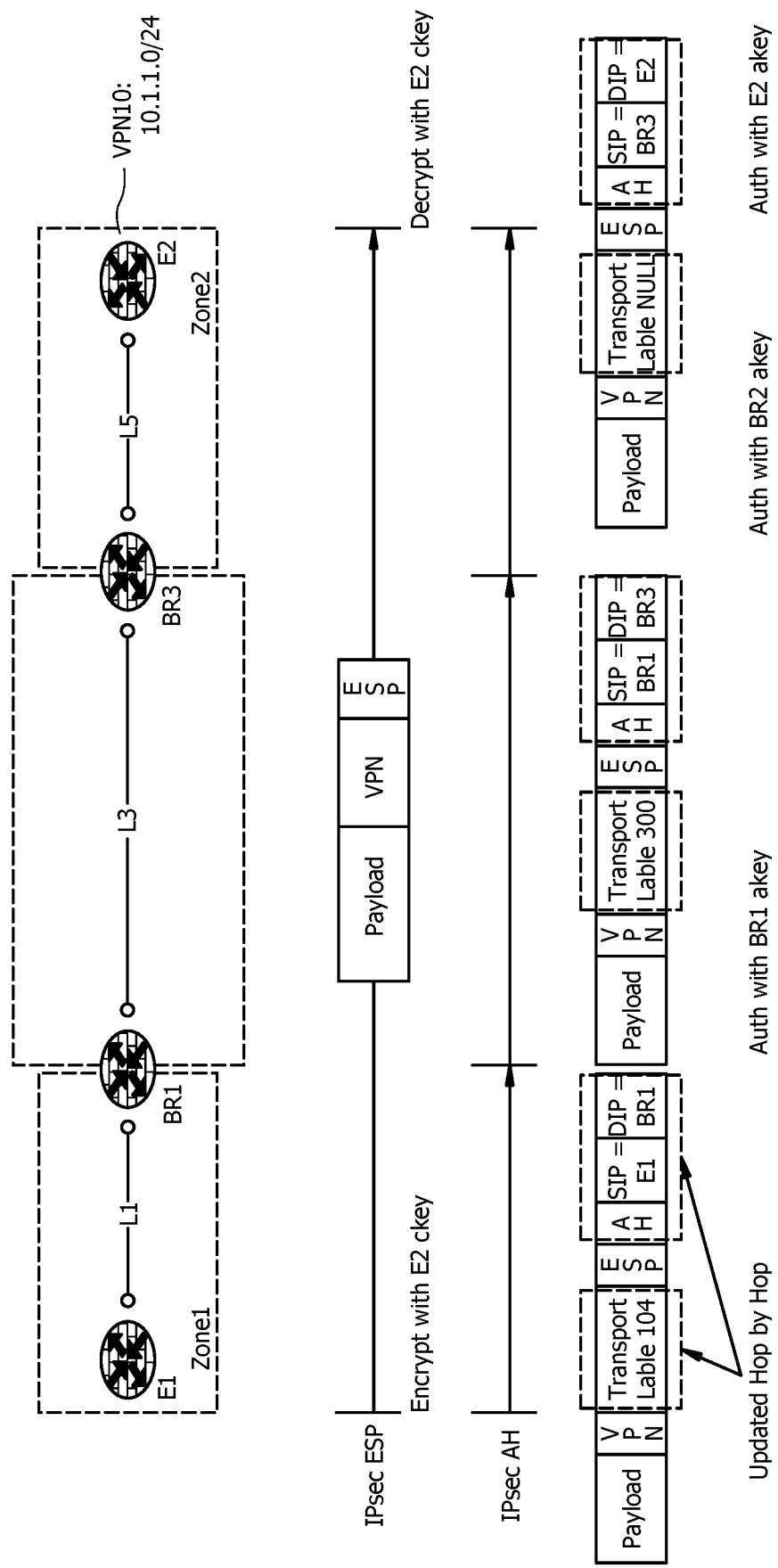
FIG. 6 is a network diagram illustrating an example packet flow for the example described in FIG. 4.

FIG. 6 is a network diagram illustrating an example packet flow for the example described in FIG. 4. A packet transported from E1 to E2 is IPSec ESP encrypted at E1 with the E2 encryption key and sent via border routers BR1 and BR3 to E2, where the packet is decrypted by E2.

At the IPSec AH layer, the transport label and source and destination IPs are updated hop by hop. Authentication is performed at each hop.

In summary, particular embodiments use MPLS label based forwarding on intermediate SD-WAN routers to eliminate the need to decrypt customer payload for IP routing. Particular embodiments perform IPSec integrity and data source validation on border routers for added security. Particular embodiments provide end to end confidentiality of customer traffic while avoiding costly decrypt/re-encrypt operations at intermediate SD-WAN routers.

Figure 7:
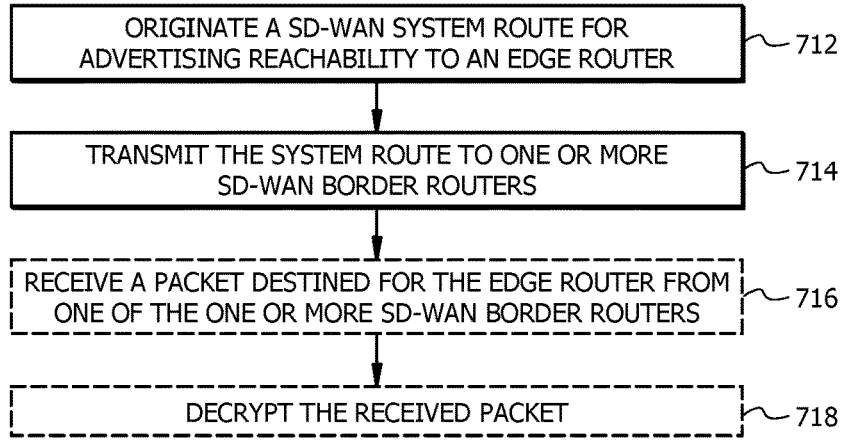
FIG. 7 is a flow diagram illustrating an example method in an edge router, according to particular embodiments.

FIG. 7 is a flow diagram illustrating an example method in a SD-WAN edge router. The SD-WAN controller is part of a SD-WAN network comprising a plurality of edge routers and a plurality of border routers. The steps of method 700 in FIG. 7 may be performed by the edge routers (e.g., E1-E9) of SD-WAN network 100 illustrated in FIGS. 1 and 3-6.

The method begins at step 712, where the edge router originates a SD-WAN system route (e.g., OMP route) for advertising reachability to the edge router. The system route comprises an encryption key (e.g., ESP) associated with the edge router.

For example, edge router E2 illustrated in FIGS. 4-6 may originate the illustrated system route.

At step 714, the edge router transmits the system route to one or more SD-WAN border routers. For example, edge router E2 illustrated in FIGS. 4-6 may transmit the originated system route to border routers BR3 and BR4.

The system route is used to transmit the encryption key associated with the edge router throughout the network. Other edge routers may use the encryption key to send packets to the edge router.

The method may continue to step 716, where the edge router receives a packet destined for the edge router from one of the one or more SD-WAN border routers. The packet is at least partially encrypted with the encryption key associated with the edge router.

For example, edge router E2 illustrated in FIGS. 4-6 may receive a packet from one of border routers BR3 and BR4.

At step 718, the edge router may decrypt the received packet. The edge router is able to decrypt the packet because the source edge router was able to encrypt the packet using the edge router encryption key distributed in the system route at steps 712 and 714.

Modifications, additions, or omissions may be made to method 700 depicted in FIG. 7. Method 700 may include more, fewer, or other steps. Additionally, steps may be performed in parallel or in any suitable order.

Figure 8:
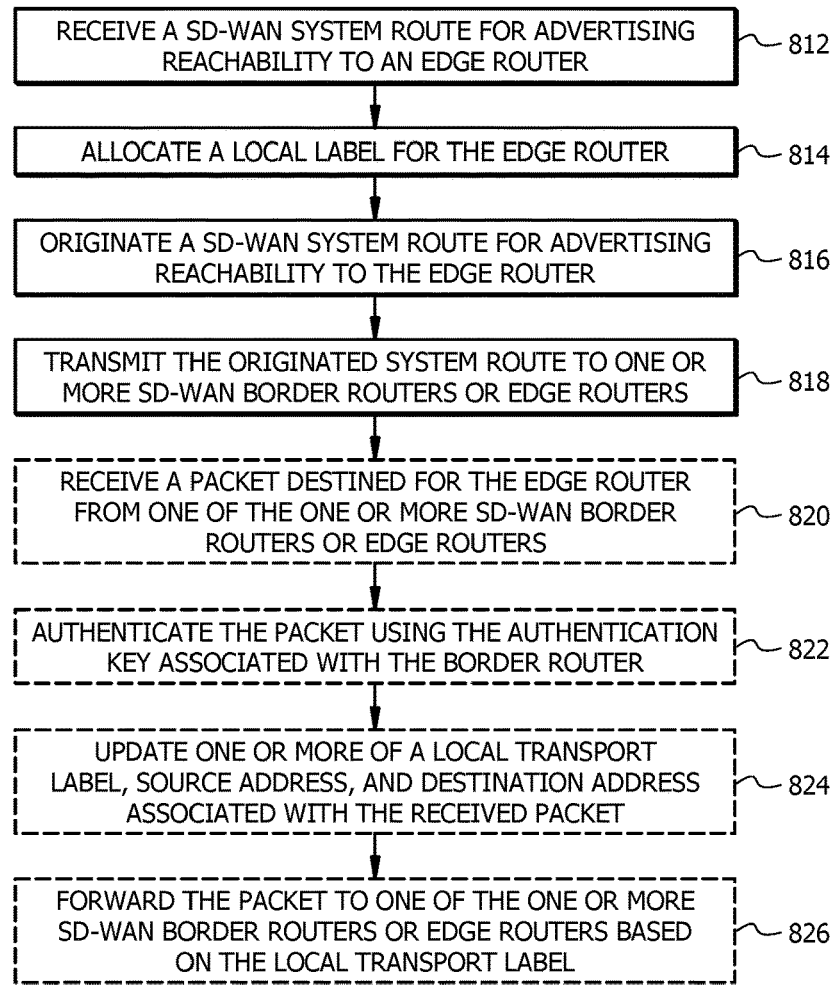
FIG. 8 is a flow diagram illustrating an example method in a border router, according to particular embodiments.

FIG. 8 is a flow diagram illustrating an example method in a border router. The border router is part of a SD-WAN network comprising a plurality of edge routers and a plurality of border routers. The steps of method 800 in FIG. 8 may be performed by border routers (e.g., BR1-BR4) of SD-WAN network 100 illustrated in FIGS. 1 and 3-6.

The method begins at step 812, where the border router receives a SD-WAN system route (e.g., OMP route) for advertising reachability to an edge router. The system route comprising an encryption key (e.g., ESP) associated with the edge router.

For example, border routers BR3 and BR4 illustrated in FIGS. 4-6 may receive the illustrated system route from edge router E2.

At step 814, the border router allocates a local label for the edge router. An example is illustrated in FIG. 6.

At step 816, the border router originates a SD-WAN system route for advertising reachability to the edge router. The system route comprises the local label for the edge router, the encryption key associated with the edge router, and an authentication key (e.g., AH) associated with the border router. Examples are illustrated in FIGS. 3-6.

At step 818, the border router transmits the originated system route to one or more SD-WAN border routers or edge routers. Examples are illustrated in FIGS. 3-6.

The system route is used to transmit the encryption key associated with the edge router and the authentication key associated with the border router throughout the network. Other routers may use the authentication key to send packets to the border router.

The method may continue to step 820, where the border router receives a packet destined for the edge router from one of the one or more SD-WAN border routers or edge routers. The packet is at least partially encrypted with the encryption key associated with the edge router and the packet comprises a local transport label. Examples are illustrated in FIGS. 3-6.

At step 822, the border router authenticates the packet using the authentication key associated with the border router.

At step 824, the border router updates one or more of a local transport label, source address, and destination address associated with the received packet. Examples are illustrated in FIGS. 3-6.

At step 826, the border router forwards the packet to one of the one or more SD-WAN border routers or edge routers based on the local transport label. Examples are illustrated in FIGS. 3-6. An advantage of particular embodiments is that steps 820-826 may be performed without decrypting the at least partially encrypted packet.

Modifications, additions, or omissions may be made to method 800 depicted in FIG. 8. Method 800 may include more, fewer, or other steps. Additionally, steps may be performed in parallel or in any suitable order.

Figure 9:
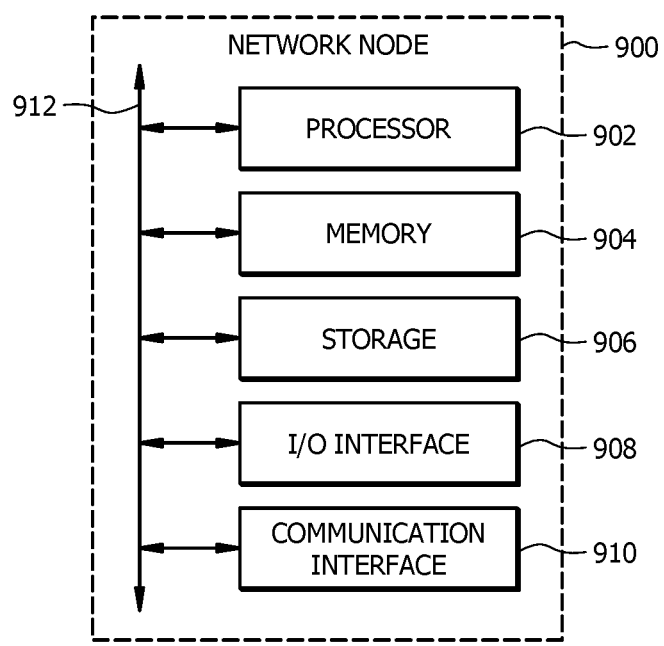
FIG. 9 is a block diagram illustrating an example network node, according to particular embodiments.

FIG. 9 is a block diagram illustrating an example network node, according to particular embodiments. A network node may comprise a SD-WAN edge router and/or a border router (such as edge routers and/or border routers described with respect to FIGS. 1 and 3-6).

In particular embodiments, one or more network nodes 900 perform one or more steps of one or more methods described or illustrated herein, such as the methods described with respect to FIGS. 7 and 8. In particular embodiments, one or more network nodes 900 provide functionality described or illustrated herein, such as the functionality described with respect to FIGS. 7 and 8. In particular embodiments, software running on one or more network nodes 900 performs one or more steps of one or more methods described or illustrated herein or provides functionality described or illustrated herein. Particular embodiments include one or more portions of one or more network nodes 900. Herein, reference to a network node may encompass a computing device, and vice versa, where appropriate. Moreover, reference to a network node may encompass one or more network nodes, where appropriate.

Particular embodiments may include any suitable number of network nodes 900. Network node 900 may take any suitable physical form. As example and not by way of limitation, network node 900 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, network node 900 may include one or more network nodes 900; be unitary or distributed; span multiple locations; span multiple machines; span multiple data centers; or reside in a cloud, which may include one or more cloud components in one or more networks.

Where appropriate, one or more network nodes 900 may perform without substantial spatial or temporal limitation one or more steps of one or more methods described or illustrated herein. As an example and not by way of limitation, one or more network nodes 900 may perform in real time or in batch mode one or more steps of one or more methods described or illustrated herein. One or more network nodes 900 may perform at different times or at different locations one or more steps of one or more methods described or illustrated herein, where appropriate.

In particular embodiments, network node 900 includes a processor 902, memory 904, storage 906, an input/output (I/O) interface 908, a communication interface 910, and a bus 912. Although this disclosure describes and illustrates a particular network node having a particular number of particular components in a particular arrangement, particular embodiments may include any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. Processor 902 may include any suitable number of any suitable internal caches, where appropriate.

As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902.

In particular embodiments, processor 902 may include one or more internal registers for data, instructions, or addresses. Processor 902 may include any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, particular embodiments may include any suitable processor.

In particular embodiments, memory 904 includes main memory for storing instructions for processor 902 to execute or data for processor 902 to operate on. As an example and not by way of limitation, network node 900 may load instructions from storage 906 or another source (such as, for example, another network node 900) to memory 904. Processor 902 may then load the instructions from memory 904 to an internal register or internal cache.

To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere).

One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. Particular embodiments may include any suitable RAM. Memory 904 may include one or more memories 904, where appropriate. Although this disclosure describes and illustrates particular memory, particular embodiments may include any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to network node 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 906 may take any suitable physical form.

Storage 906 may include one or more storage control units facilitating communication between processor 902 and storage 906, where appropriate. Where appropriate, storage 906 may include one or more storages 906. Although this disclosure describes and illustrates particular storage, particular embodiments may include any suitable storage.

In particular embodiments, I/O interface 908 includes hardware, software, or both, providing one or more interfaces for communication between network node 900 and one or more I/O devices. Network node 900 may include one or more of these I/O devices, where appropriate. One or more of these I/O devices may enable communication between a person and network node 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. Particular embodiments may include any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, particular embodiments may include any suitable I/O interface. In particular embodiments, I/O interface 908 may include an interface to a remote network management system.

In particular embodiments, communication interface 910 includes hardware, software, or both providing one or more interfaces for communication (such as, for example, packet-based communication) between network node 900 and one or more other network nodes 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network.

Particular embodiments may include any suitable network and any suitable communication interface 910 for it. As an example and not by way of limitation, network node 900 may communicate with an ad hoc network, a personal area network (PAN), a LAN, WAN, MAN, or one or more portions of the Internet or a combination of two or more of these. One or more portions of one or more of these networks may be wired or wireless. As an example, network node 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Network node 900 may include any suitable communication interface 910 for any of these networks, where appropriate. Communication interface 910 may include one or more communication interfaces 910, where appropriate. Although this disclosure describes and illustrates a particular communication interface, particular embodiments may include any suitable communication interface.

In particular embodiments, bus 912 includes hardware, software, or both coupling components of network node 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, particular embodiments may include any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein.

What is claimed is:

1. A method performed by a software defined wide area network (SD-WAN) edge router in a hierarchical SD-WAN network comprising a plurality of edge routers and a plurality of border routers, the method comprising:
   originating a SD-WAN system route for advertising reachability to the SD-WAN edge router, the SD-WAN system route comprising an encryption key associated with the SD-WAN edge router; and
   transmitting the SD-WAN system route to one or more SD-WAN border routers.

2. The method of claim 1, further comprising:
   receiving a packet destined for the SD-WAN edge router from one of the one or more SD-WAN border routers, wherein the packet is at least partially encrypted with the encryption key associated with the SD-WAN edge router, and wherein the encryption key associated with the SD-WAN edge router is unaltered in transit across the one or more SD-WAN border routers; and
   decrypting the packet.

3. The method of claim 1, wherein the SD-WAN system route comprises a SD-WAN Overlay Management Protocol (OMP) route.

4. The method of claim 1, wherein the encryption key associated with the SD-WAN edge router comprises an Internet Protocol Security (IPSec) Encapsulating Security Payload (ESP) protocol encryption key.

5. The method of claim 1, wherein the SD-WAN edge router is communicably coupled to one or more of the plurality of border routers via one or more Internet Protocol Security (IPSec) tunnels.

6. A method performed by a software defined wide area network (SD-WAN) border router in a hierarchical SD-WAN network comprising a plurality of edge routers and a plurality of border routers, the method comprising:
   receiving a first SD-WAN system route for advertising reachability to an SD-WAN edge router, the first SD-WAN system route comprising an encryption key associated with the SD-WAN edge router;
   allocating a local label for the SD-WAN edge router;
   originating a second SD-WAN system route for advertising reachability to the SD-WAN edge router, the second SD-WAN system route comprising the local label for the SD-WAN edge router, the encryption key associated with the SD-WAN edge router, and an authentication key associated with the SD-WAN border router; and transmitting the second SD-WAN system route to one or more SD-WAN border routers or edge routers.

7. The method of claim 6, further comprising:

receiving a packet destined for the SD-WAN edge router from one of the one or more SD-WAN border routers or edge routers, wherein the packet is at least partially encrypted with the encryption key associated with the SD-WAN edge router and the packet comprises a local transport label, and wherein the encryption key associated with the SD-WAN edge router is unaltered in transit across the one or more SD-WAN border routers;

authenticating the packet using the authentication key associated with the SD-WAN border router;

updating one or more of a local transport label, source address, and destination address associated with the packet; and forwarding the packet to one of the one or more SD-WAN border routers or edge routers based on the local transport label without decrypting the packet.

8. The method of claim 6, wherein the second SD-WAN system route comprises a SD-WAN Overlay Management Protocol (OMP) route.

9. The method of claim 6, wherein the encryption key associated with the SD-WAN edge router comprises an Internet Protocol Security (IPSec) Encapsulating Security Payload (ESP) protocol encryption key.

10. The method of claim 6, wherein the authentication key associated with the SD-WAN border router comprises an Internet Protocol Security (IPSec) Security Authentication Header (AH) protocol authentication key.

11. The method of claim 6, wherein the SD-WAN border router is communicably coupled to the one or more border routers or edge routers via one or more Internet Protocol Security (IPSec) tunnels.

12. A software defined wide area network (SD-WAN) system comprising a first edge router communicably coupled to a first border router:

the first edge router comprising a memory comprising instructions and a hardware processor, wherein the first edge router, when executing its instructions at its hardware processor, is configured to:

originate a first SD-WAN system route for advertising reachability to the first edge router, the first SD-WAN system route comprising an encryption key associated with the first edge router; and transmit the first SD-WAN system route to the first border router; and the first border router comprising a memory comprising instructions and a hardware processor, wherein the first border router, when executing its instructions at its hardware processor, is configured to:

receive the first SD-WAN system route for advertising reachability to the first edge router;

allocate a local label for the first edge router;

originate a second SD-WAN system route for advertising reachability to the first edge router, the second SD-WAN system route comprising the local label for the first edge router, the encryption key associated with the first edge router, and an authentication key associated with the first border router; and transmit the second SD-WAN system route to one or more SD-WAN border routers or edge routers.

13. The SD-WAN system of claim 12, wherein the first edge router is further configured to:

receive a packet destined for the first edge router from the first border router, wherein the packet is at least partially encrypted with the encryption key associated with the first edge router, and wherein the encryption key associated with the first edge router is unaltered in transit across the one or more SD-WAN border routers; and decrypt the packet.

14. The SD-WAN system of claim 12, wherein the first border router is further configured to:

receive a packet destined for the first edge router from one of one or more SD-WAN border routers or edge routers, wherein the packet is at least partially encrypted with the encryption key associated with the first edge router and the packet comprises a local transport label;

authenticate the packet using the authentication key associated with the first border router;

update one or more of a local transport label, source address, and destination address associated with the packet; and forward the packet to one of the one or more SD-WAN border routers or edge routers based on the local transport label without decrypting the packet.

15. The SD-WAN system of claim 12, wherein the first SD-WAN system route comprises a SD-WAN Overlay Management Protocol (OMP) route.

16. The SD-WAN system of claim 12, wherein the encryption key associated with the first edge router comprises an Internet Protocol Security (IPSec) Encapsulating Security Payload (ESP) protocol encryption key.

17. The SD-WAN system of claim 12, wherein the authentication key associated with the first border router comprises an Internet Protocol Security (IPSec) Security Authentication Header (AH) protocol authentication key.

18. The SD-WAN system of claim 12, wherein the first edge router is communicably coupled to the first border router via an Internet Protocol Security (IPSec) tunnel.

19. The SD-WAN system of claim 12, wherein the first edge router is further configured to:

encrypt a packet for transmission to a second edge router, wherein the packet is encrypted with an encryption key associated with the second edge router received via a system route originated from the second edge router; and transmit the packet to the first border router.

* * * * *